United States Patent
Wang et al.

(10) Patent No.: US 8,571,050 B1
(45) Date of Patent: Oct. 29, 2013

(54) METHOD AND APPARATUS TO OPTIMIZE CLASS OF SERVICE UNDER MULTIPLE VCS WITH MIXED RELIABLE TRANSFER AND CONTINUOUS TRANSFER MODES

(75) Inventors: Chi-Lie Wang, Milpitas, CA (US); Ming-Shiung Chen, Santa Clara, CA (US); Jason Z Mo, Fremont, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 497 days.

(21) Appl. No.: 12/818,805

(22) Filed: Jun. 18, 2010

(51) Int. Cl.
*H04L 12/28* (2006.01)

(52) U.S. Cl.
USPC ........... 370/412; 370/394; 370/392; 370/474; 710/61; 710/22; 710/104; 711/154; 711/171

(58) Field of Classification Search
USPC ............ 370/392, 394, 412, 352, 235; 710/18, 710/61, 22, 104; 711/154, 171
See application file for complete search history.

(56) References Cited

U.S. PATENT DOCUMENTS

| | | | |
|---|---|---|---|
| 6,538,992 B1* | 3/2003 | Subbiah et al. | 370/230 |
| 7,106,742 B1* | 9/2006 | Frisch et al. | 370/394 |
| 7,356,628 B2* | 4/2008 | Swartzentruber | 710/104 |
| 7,372,813 B1* | 5/2008 | Cimino et al. | 370/235 |
| 7,835,277 B2* | 11/2010 | Kim et al. | 370/230 |
| 8,238,339 B1* | 8/2012 | Wang et al. | 370/392 |
| 2004/0151197 A1* | 8/2004 | Hui | 370/412 |
| 2005/0018609 A1* | 1/2005 | Dally et al. | 370/235 |
| 2005/0083917 A1* | 4/2005 | Okamoto et al. | 370/352 |
| 2008/0232386 A1* | 9/2008 | Gorti et al. | 370/412 |
| 2010/0138628 A1* | 6/2010 | Sze et al. | 711/171 |

* cited by examiner

*Primary Examiner* — Andrew Chriss
*Assistant Examiner* — Mohamed Kamara
(74) *Attorney, Agent, or Firm* — Heimlich Law, PC; Alan Haimlich, Esq.

(57) ABSTRACT

A method and apparatus to optimize class of service under multiple VCs with mixed reliable transfer (RT) and continuous transfer (CT) modes have been disclosed where outstanding packets to be processed is through a Retransmission Mapper with a VOQ read pointer realignment that can quickly optimize network traffic with multiple VCs and mixed RT/CT modes.

7 Claims, 8 Drawing Sheets

METHOD AND APPARATUS TO OPTIMIZE CLASS OF SERVICE UNDER MULTIPLE VCS WITH MIXED RELIABLE TRANSFER AND CONTINUOUS TRANSFER MODES

RELATED APPLICATION

This application is related to application Ser. No. 12/818,767 filed this same date titled "Method and Apparatus for Unified Final Buffer with Pointer-based and Page-based Scheme for Traffic Optimization", which is hereby incorporated herein by reference in its entirety including all incorporated references therein. This application is related to application Ser. No. 12/818,822 filed this same date titled "Method and Apparatus to Optimize System Throughput with Retransmission Avoidance through Transmitter-Controlled Flow Control", which is hereby incorporated herein by reference in its entirety including all incorporated references therein.

FIELD OF THE INVENTION

The present invention pertains to switches. More particularly, the present invention relates to a method and apparatus to optimize class of service under multiple VCs (virtual channels) with mixed reliable transfer (RT) and continuous transfer (CT) modes.

BACKGROUND OF THE INVENTION

Switches are widely used in systems. For example, the Serial Rapid Input Output (sRIO) Gen2 Switch may be used to meet wireless infrastructure customer's requirements for WCDMA/LTE Base Stations.

Quality Of Service (QOS) is an important issue in insuring that data that needs to arrive does so that the transmission does not suffer (e.g. video breaking up, voice dropping out, etc.) Switches are used to handle the data and quality of service is important across switch fabric. Certain traffic type may require reliable transfer without any packet loss through packet retransmission with low latency. Other traffic types can afford to be lossy but require fastest throughput. Under multiple Virtual Channels (VCs) with mixed Reliable Transfer/Continuous Transfer (RT/CT) modes, it may be difficult to handle packet retransmission for a VC in RT mode and discard the packets for a VC in CT mode. As a result, network traffic cannot be optimized especially when many packets are outstanding with large packet sizes. This presents a problem.

BRIEF DESCRIPTION OF THE DRAWINGS

The invention is illustrated by way of example and not limitation in the figures of the accompanying drawings in which.

DETAILED DESCRIPTION

For illustration purposes, the techniques of the present invention will be illustrated using an 18-port Serial Rapid IO (sRIO) Gen2 Switch. The techniques may be applied to other switches and other scenarios. In one embodiment of the invention, an 18-port Serial Rapid IO (sRIO) Gen2 Switch is to be implemented to achieve very high performance (up to 360 Gbit) with minimum latency (<30 ns excluding sRIO protocol stack delay) to meet wireless infrastructure customer's requirements for WCDMA/LTE Base Stations. While some applications cannot tolerate any packet loss, others may be acceptable for packet loss but desire to achieve the fastest throughput. An innovative idea is developed to support Reliable Transfer (RT) mode and Continuous Transfer (CT) mode among different VCs through Serial Rapid IO Gen2 Switches to satisfy different application needs with different traffic class. In addition, by storing VOQ Read Pointer in the Retransmit Mapper while the packet is being transmitted out, all the outstanding packets can be processed at once when NACK is returned, which will allow RT mode packet retransmission and CT mode packet silently discard through the stored VOQ read pointer realignment at once. As a result, system performance can be optimized with minimum overhead to handle packet retransmission.

In one embodiment of the invention, Reliable Transfer (RT) mode will be supported through packet retransmission as packet loss is not allowed.

On inbound side, packet can only be accepted if there is any input buffer space available with ACK (ACKnowledgment) (packet accepted control symbol) returned. Otherwise, NACK (Not ACKnowledgment) (packet not accepted control symbol) will be returned to request packet retransmission from Link Partner.

On outbound side, ACK received from Link Partner will cause Egress Final Buffer to be freed up. Otherwise, NACK received will cause packet retransmission from Egress Final Buffer.

In one embodiment of the invention, Continuous Transfer (CT) mode allows packet loss therefore packet retransmission will not be necessary and the received packets will be lost if Input Buffer has no space to accommodate them.

On inbound side, ACK will be returned and the received packets will be discarded even if there is no Input Buffer available to accept them.

On outbound side, NACK returned from Link Partner will not cause packet retransmission and the packet will be silently (e.g. not notification) dropped to free up buffer space.

In one embodiment of the invention, VC0 only supports RT mode therefore it will be used for lossless data transfers. VC1/VC5 can support either RT mode or CT mode. While CT mode is supported, lossy data transfers may occur which should be able to be tolerated by target applications.

In one embodiment of the invention, Retransmission Mapper will be used to store memory page pointer for VC0 packets or VOQ (Virtual Output Queue) read pointer and dword count for VC1/VC5 packets being selected through transmitted packet index.

In one embodiment of the invention, after Outbound Link Partner receives the packet successfully with ACK returned, the returned packet index will be used for Retransmission Mapper look-up to retrieve the stored memory page pointer (for VC0 packets) or dword count (for VC1/VC5 packets), which will be used to release the memory page pointer to Free Buffer List or dword count to dword counter accordingly.

In one embodiment of the invention, if Link Partner returned NACK (instead of ACK), packet retransmission will be necessary. The returned packet index will be used to look up the stored VOQ read pointer from Retransmission Mapper. For RT mode packets, the read pointer will be realigned to allow the stored packets being NACKed to be retransmitted. For CT mode packet, the retrieved VOQ read pointer will not be realigned therefore the stored packets being NACKed will not be retransmitted.

In one embodiment of the invention, the techniques discussed above allows RT/CT mode traffic class to be supported with multiple VCs through hardware. While NACK is returned, all the outstanding packets can be processed at once to allow RT mode packet retransmission and CT mode packet silently discard through VOQ read pointer realignment which could further improve performance.

In one embodiment of the invention, RT mode is similar to TCP traffic (e.g error free) and CT mode is similar to UDP (e.g. no guarantee) traffic under TCP/IP network but hardware based RT/CT support will allow much faster data transfers and result in superior end-to-end performance with all the outstanding packets to be processed through hardware at once.

Switch Data Path

Figure 3:
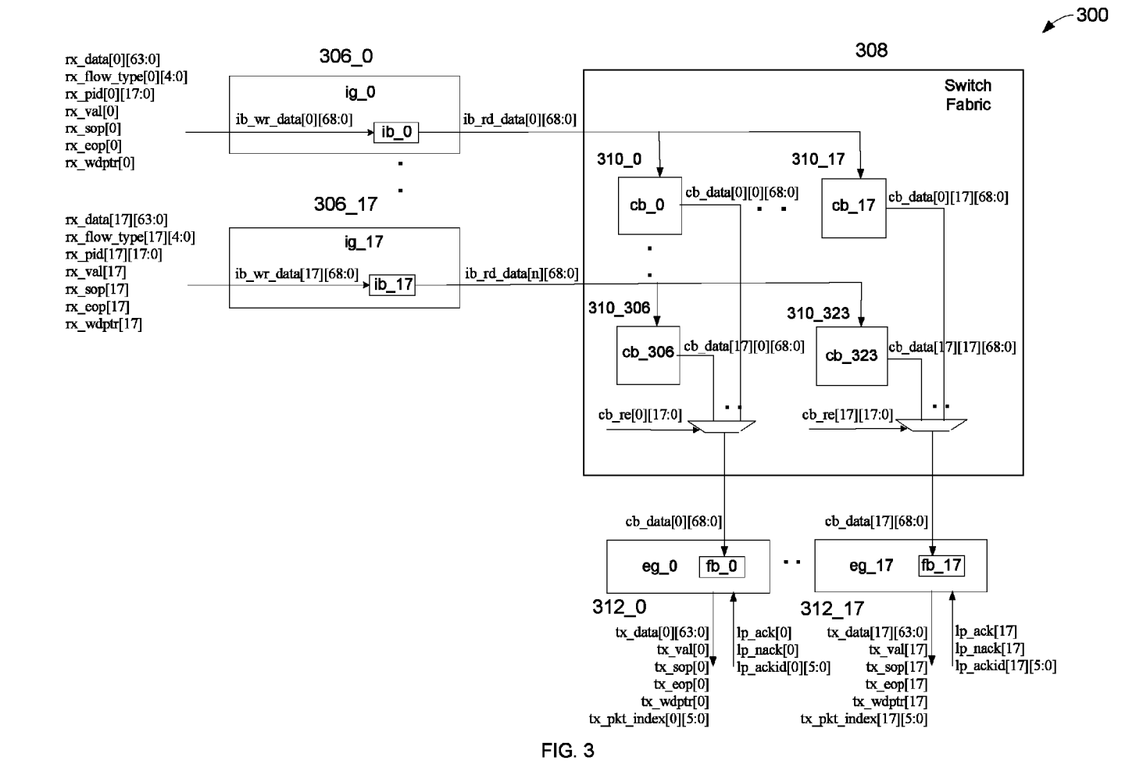
FIG. 3 illustrates one embodiment of the invention showing a switch data path.

FIG. 3 illustrates, generally at 300, one embodiment of the invention showing a switch data path for an 18-port Buffered Crossbar Switch, it consists of 18 Ingress Ports and each has an Input Buffer (IB) for packet reception. The received packet being stored into Input Buffer will be forwarded to one or multiple (for multicast support) of the 18 Crosspoint Buffers (CB) within a given row that corresponding to 18 Egress Ports. Total of 324 (18×18) CBs will be constructed within Switch Fabric. There are 18 Egress Ports and each has a Final Buffer (FB) that receives the forwarded packet from one of the 18 CBs within a given column that corresponding to 18 Input Ports.

In FIG. 3, at 306_0 through 306_17 are ingress ports (ig_0 through ig_17) each receiving a variety of inputs such as receive data (rx_data[p][63:0]), receive flow type (rx_flow_type[p][4:0]), receive destination port ID (rx_pid[p][17:0]), receive valid cycle (rx_val[p]), receive start of packet (rx_sop[p]), receive end of packet (rx_eop[p]), receive word pointer (rx_wdptr[p]), where p denotes the ingress port number (0 through 17). These inputs are for illustration and are not germane to understanding the invention beyond the concept that there is data received with a priority and it is switched. Each ingress port has an ingress buffer denoted ib_0 through ib_17 and receives an input denoted ib_wr_data[p][68:0], where again p refers to the port number. ib_wr_data[p][68:0] consists of the receive data, rx_data[p][63:0], and for example bit 64 being rx_sop[p], bit 65 being rx_eop[p], bit 66 being rx_wdptr[p], and bits 67 and 68 being reserved. Each an ingress buffer denoted ib_0 through ib_17 can be read and will output buffered data denoted ib_rd_data[p][68:0], where again p refers to the port number. ib_rd_data[p][68:0] consists of the receive data, rx_data[p][63:0], and for example bit 64 being rx_sop[p], bit 65 being rx_eop[p], bit 66 being rx_wdptr[p], and bits 67 and 68 being reserved.

In FIG. 3, at 308 is a switch fabric, having 310_0 through 310_323 crosspoint buffers denoted cb_0 through cb_323.

In FIG. 3, at 312_0 through 312_17 are egress ports (eg_0 through eg_17) each receiving a variety of inputs from the switch fabric 308 (cb_data[q][68:0], where q denotes the egress port number (0 through 17). Each egress port has an egress buffer denoted fb_0 through fb_17. Each egress port has outputs, for example, transmit data (tx_data[q][63:0]), transmit valid cycle (tx_val[q]), transmit start of packet (tx_sop[q]), transmit end of packet (tx_eop[q]), transmit word pointer (tx_wdptr[q]), and transmit packet index) tx_pkt_index[q][5:0], where q denotes the egress port number (0 through 17). Each egress port also has inputs received from a link partner, for example link partner ack (lp_ack[q]), link partner nack (lp_nack[q]), and link partner ack ID (lp_ackid[q][5:0]) where again q denotes the egress port number (0 through 17).

Final Buffer Virtual Output Queue (VOQ)

In one embodiment of the invention there are final buffer virtual output queues.

In one embodiment of the invention the Final Buffer Virtual Output Queues (fb_voq) have the following features:

Each Egress Port's Final Buffer has one VOQ set with 10 VOQs. 8 for VC0 to represent 4 different priorities with CRF (CRitical Flow) bit set or reset, 1 each for VC1 & VC5. Note that a CRF of 0 is lower, whereas CRF=1 is higher.

Each VOQ entry stores a memory page pointer for VC0 packet or memory buffer address for VC1/VC5 packets while the packet is being written into Final Buffer.

Based on the selected memory page pointer or buffer address, write address will be generated and incremented accordingly to write the packet data into Final Buffer.

The stored memory page pointer or buffer address will be used to generate Final Buffer read address while the VOQ is being selected to read out the packet.

If the packet needs to be retransmitted for RT mode packets, the stored VOQ read pointer will be retrieved from Packet Retransmission Mapper which will be used to realign the VOQ entry to allow the packets to be retransmitted.

Figure 4:
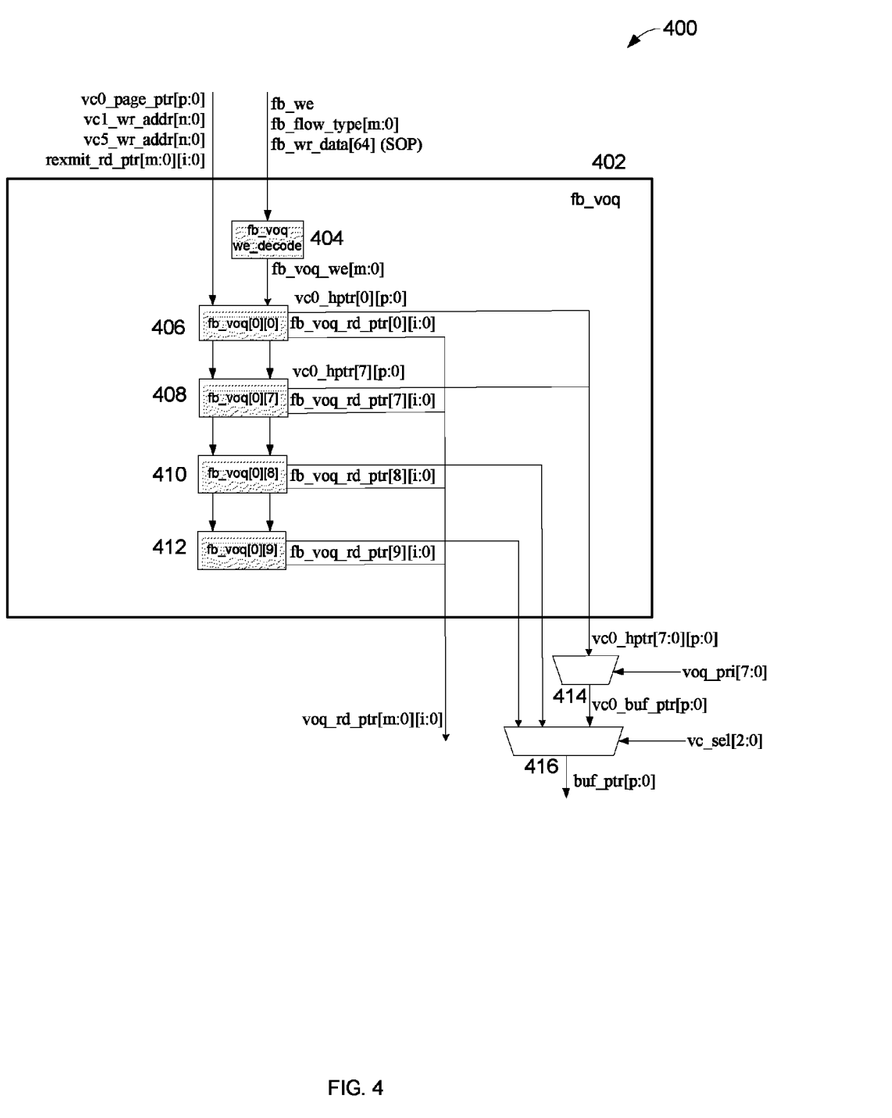
FIG. 4 illustrates one embodiment of the invention showing a final buffer virtual output queue.

FIG. 4 illustrates, generally at 400, one embodiment of the invention showing final buffer virtual output queues. At 402 is fb_voq. At 404 is final buffer virtual output queue write enable decode (fb_voq we_decode). At 406 through 408 are virtual queues, representing, for example VC0. At 410 is a virtual queue, representing, for example VC1. At 412 is a virtual queue, representing, for example VC5. At 414 and 416 are selection logic.

In one embodiment of the invention, for example, as illustrated in FIG. 4, for (m=0; m<=9; m=m+1); fb_voq_we[m]= fb_we & fb_flow_type[m] & fb_wr_data[64] (SOP cycle).

In one embodiment of the invention, for example, as illustrated in FIG. 4, i=6 to support up to 65 VOQ entries In one embodiment of the invention, for example, as illustrated in FIG. 4, n=5 to support up to 64 Packet Index.

In one embodiment of the invention, for example, as illustrated in FIG. 4, m=9 to support 10 flows (8 for VC0 with 4 different priority levels with CRF set/reset. 1 each for VC1 & VC5)

In one embodiment of the invention, for example, as illustrated in FIG. 4, p=5 to support up to 34 memory pages.

In one embodiment of the invention, for example, as illustrated in FIG. 4, fb_voq_we[7:0] will be used to write VC0 packet's memory page pointer (vc0_page_ptr[p:0]) to the respective VC0 VOQ being selected through fb_flow_type[7:0] (corresponding to each priority level) at SOP cycle.

In one embodiment of the invention, for example, as illustrated in FIG. 4, fb_voq_we[9:8] will be used to write VC5/VC1 packet's memory write address (vc5_wr_addr[n:0] & vc1_wr_addr[n:0]) to the respective VC5/VC1 VOQ being selected through fb_flow_type[9:8] at SOP cycle.

In one embodiment of the invention, for example, as illustrated in FIG. 4, vc0_hptr[7:0][p:0] are the head of line memory page pointer for each priority level of VC0, which can be used to select the specific memory page (buf_ptr[p:0]) to transmitted the highest priority (selected through voq_pri [7:0]) VC0 packet out of the Final Buffer. This information will also be stored into Packet Retransmission Mapper which can be retrieved for buffer release if packet retransmission is not necessary.

In one embodiment of the invention, for example, as illustrated in FIG. 4, voq_rd_ptr[9:0][i:0] will be stored into Packet Retransmission Mapper which can be retrieved to realign VOQ entry if packet retransmission is necessary.

In one embodiment of the invention, for example, as illustrated in FIG. 4, rexmit_rd_ptr[m:0][i:0] retrieved from Packet Retransmission Mapper which will be reloaded into the specific voq_rd_ptr[i:0] if packet retransmission is necessary.

Ingress Packet Receiver and ACK Generator

In one embodiment of the invention there is an Ingress Packet Receiver and ACK Generator.

In one embodiment of the invention, each time a packet is being transferred from Inbound Link Partner to switch Ingress Port's Input Buffer; Input Buffer available indication for the specific VC/priority will be inspected along with VC Transfer mode. If it is in RT mode with buffer available indication, ACK will be returned to Link Partner with packet to be written into Input Buffer. Otherwise, NACK will be returned to request Link Partner for packet retransmission. If the incoming packet is in CT mode with buffer available indication, it will be handled the same way as RT mode. ACK will be returned to Link Partner with packet to be written into Input Buffer. Otherwise, even if input buffer is not available, ACK will still be returned to Link Partner as packet retransmission will not be necessary. However, the packet will not be written into Input Buffer. It will be discarded instead as there is no space in Input Buffer to accommodate the packet.

Figure 5:
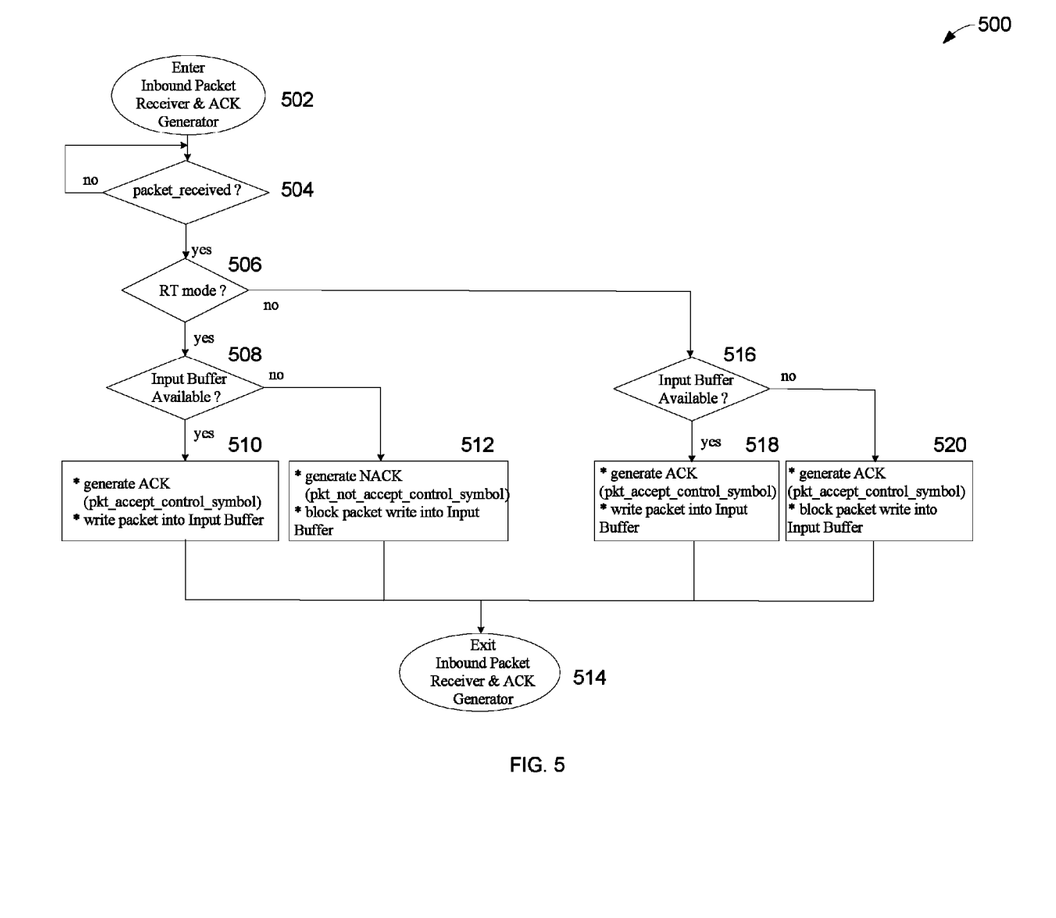
FIG. 5 illustrates one embodiment of the invention in flow chart form.

FIG. 5 illustrates, generally at 500, one embodiment of the invention in flow chart form.

At 502 enter the inbound packet receiver and acknowledgement generator routine (Enter Inbound Packet Receiver & ACK Generator). At 504 a check is made to see if a packet is received (packet_received ?). If a packet is not received then, in this embodiment of the invention, it loops back to 504. In other embodiments (not shown in FIG. 5, other processing may be done). If a packet is received then a check at 506 is made to see if the packet is in RT mode (RT mode ?). If the packet is in RT mode then at 508 a check is made to see if an input buffer is available (Input Buffer Available ?). If an input buffer is available then at 510 an ACK is generated (* generate ACK (pkt_accept_control_symbol)) and the packet is written into the input buffer (* write packet into Input Buffer). Then at 514 the routine is exited (Exit Inbound Packet Receiver & ACK Generator). If an input buffer is not available at 508 then at 512 a NACK is generated (* generate NACK (pkt_not_accept_control_symbol)) and the packet is not written into the input buffer (* block packet write into Input Buffer). Then at 514 the routine is exited (Exit Inbound Packet Receiver & ACK Generator). If at 506 the packet is not in RT mode than at 516 a check is made to see if an input buffer is available (Input Buffer Available ?). If an input buffer is available then at 518 an ACK is generated (* generate ACK (pkt_accept_control_symbol)) and the packet is written into the input buffer (* write packet into Input Buffer). Then at 514 the routine is exited (Exit Inbound Packet Receiver & ACK Generator). If an input buffer is not available at 516 then at 520 an ACK is generated (* generate ACK (pkt_accept_control_symbol)) and the packet is not written into the input buffer (* block packet write into Input Buffer). Then at 514 the routine is exited (Exit Inbound Packet Receiver & ACK Generator). Note that if the packet at 506 is not in RT mode, then it is in CT mode and thus the ACK being generated at 518 and 520 regardless of input buffer availability.

Egress Packet Transmission Handler

In one embodiment of the invention there is an Egress Packet Transmission Handler.

In one embodiment of the invention, an Egress Packet Transmission Handler has the following functional blocks.

1. Packet Retransmission Mapper
2. Dword Count Mapper
3. Packet Response Handler In one embodiment of the invention, while a packet is being transmitted out of Egress Port's Final Buffer, the packet's VC type (VOQ Index), transfer mode, memory page pointer and VOQ Read Pointer will be stored into Packet Retransmission Mapper. For VC1/VC5 packets, their dword count will also be stored into Dword Count Mapper. After the ACK or NACK is returned from Outbound Link Partner, the stored information will be retrieved and Packet Response Handler will be invoked. Based on the returned acknowledgement (ACK/NACK) along with the packet index, all the outstanding packets can be identified. The stored information will be retrieved from Packet Retransmission Mapper and Dword Count Mapper, which will be used to determine which of the outstanding packets shall be retransmitted, or their buffer can be released for future use as packet retransmission is not necessary.

Packet Retransmission Mapper

In one embodiment of the invention, there is a Packet Retransmission Mapper.

In one embodiment of the invention, Packet Retransmission Mapper will be used to store packet's transfer mode (RT/CT), memory page pointer (for VC0 packets), VOQ Index (to select VC5, VC1 or a specific priority of a VC0 packet) and VOQ read pointer while the packet is being transmitted out. After ACK or NACK is returned from Link Partner, the stored information will be retrieved for all the outstanding packets. Based on their VC type and transfer mode, either packet retransmission will be requested, or buffer will be freed up for future use.

Figure 6:
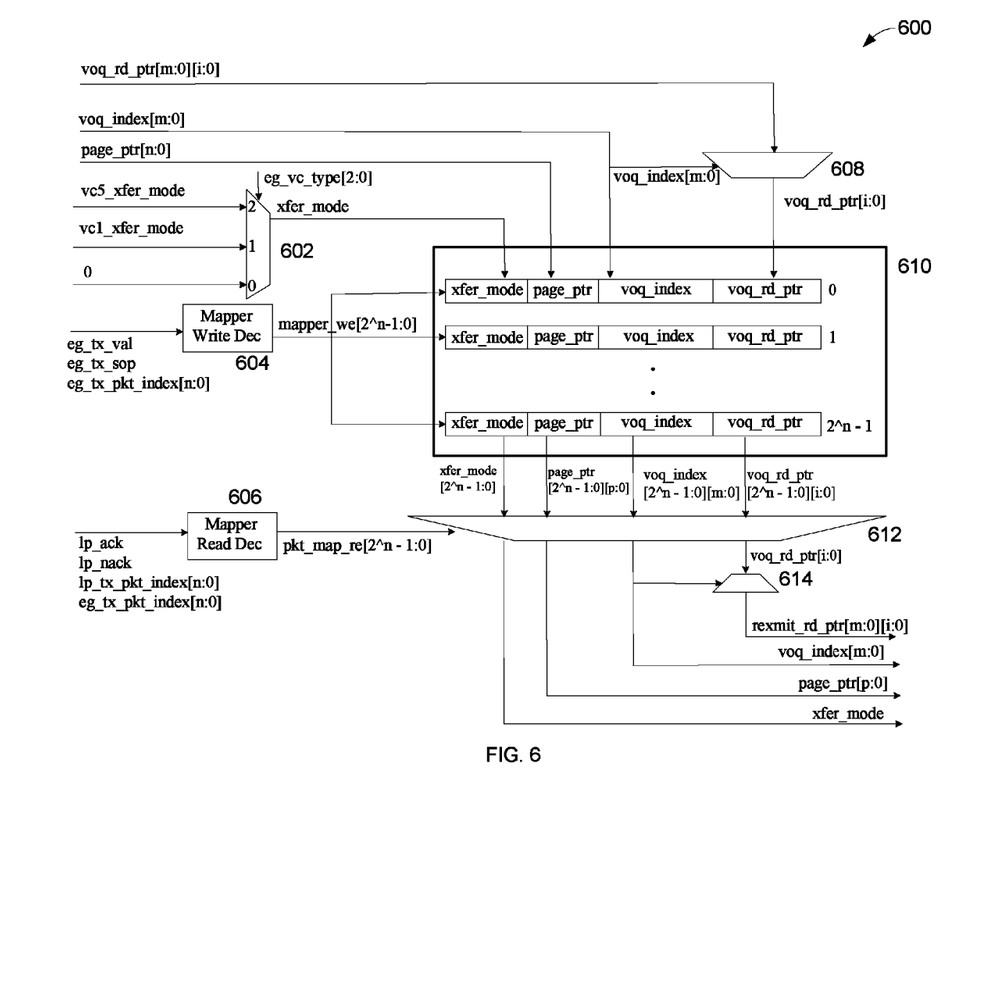
FIG. 6 illustrates one embodiment of the invention in block form.

FIG. 6 illustrates, generally at 600, one embodiment of the invention in block form.

In one embodiment of the invention, for example, as illustrated in FIG. 6, i=6 to support up to 65 VOQ entries for VC1/VC5 (VC0 only needs to support 35 VOQ entries).

In one embodiment of the invention, for example, as illustrated in FIG. 6, n=5 to support up to 64 Packet Index.

In one embodiment of the invention, for example, as illustrated in FIG. 6, m=9 to support 10 flows (8 for VC0 with 4 different priority levels with CRF set/reset. 1 each for VC1 & VC5).

In one embodiment of the invention, for example, as illustrated in FIG. 6, VC0 will always be in RT mode. VC1 & VC5 can either be RT mode or CT mode based on vc1_xfer_mode and vc5_xfer_mode setting. For CT mode packet during retransmission request, it will not be retransmitted and its dword count will be released to decrement Dword Counter which will be used for free buffer space calculation.

In one embodiment of the invention, for example, as illustrated in FIG. 6, while the packet is being transmitted out, its RT/CT transfer mode (xfer_mode), memory page pointer (page_ptr[P:0]) for VC0 packet, VOQ read pointer (voq_rd_ptr[i:0]) and VOQ index (voq_index[m:0]) for VC5, VC1 & VC0 with 8 different priority will be written into Retransmit Mapper being selected through transmitted packet index (eg_tx_pkt_index[n)]) at Start of Packet cycle (eg_tx_sop) while valid indication (eg_tx_val) is asserted.

In one embodiment of the invention, for example, as illustrated in FIG. 6, the stored information will be retrieved being selected through the returned packet index (Ip_tx_pkt_index [n:0]) after either ACK (Ip_ack) or NACK (Ip_nack) is generated from Link partner. This information will be used to release memory page pointer for VC0 packets or release dword count for VC1/VC5 packets if packet retransmission is not necessary, or realign VOQ read pointer if packet retransmission is needed between Ip_tx_pkt_index[n:0] and eg_tx_pkt_index[n:0]) for all the outstanding packets.

In FIG. 6 at 602, 608, 612, and 614 are selection logic. At 604 is Mapper Write Decoder (Mapper Write Dec). At 606 is Mapper Read Decoder (Mapper Read Dec). At 610 is storage for a variety of information (e.g. xfer_mode (i.e. RT or CT), page_ptr, voq_index, voq_rd_ptr).

At 602 input 0 is forced to 0, thus VC0 is forced into RT mode (0=RT mode) in this embodiment.

Dword Count Mapper

In one embodiment of the invention there is a Dword Count Mapper.

In one embodiment of the invention, Dword Count Mapper will be used to store the transmitted packet's dword count. Each time a VC1/VC5 packet is being transmitted out, its dword count will be stored into a Dword Count Mapper being selected through transmitted packet index. The stored information will be retrieved through returned packet index while ACK (packet accepted control symbol) or NACK (packet not accepted control symbol) is sent back from Outbound Link partner.

Figure 7:
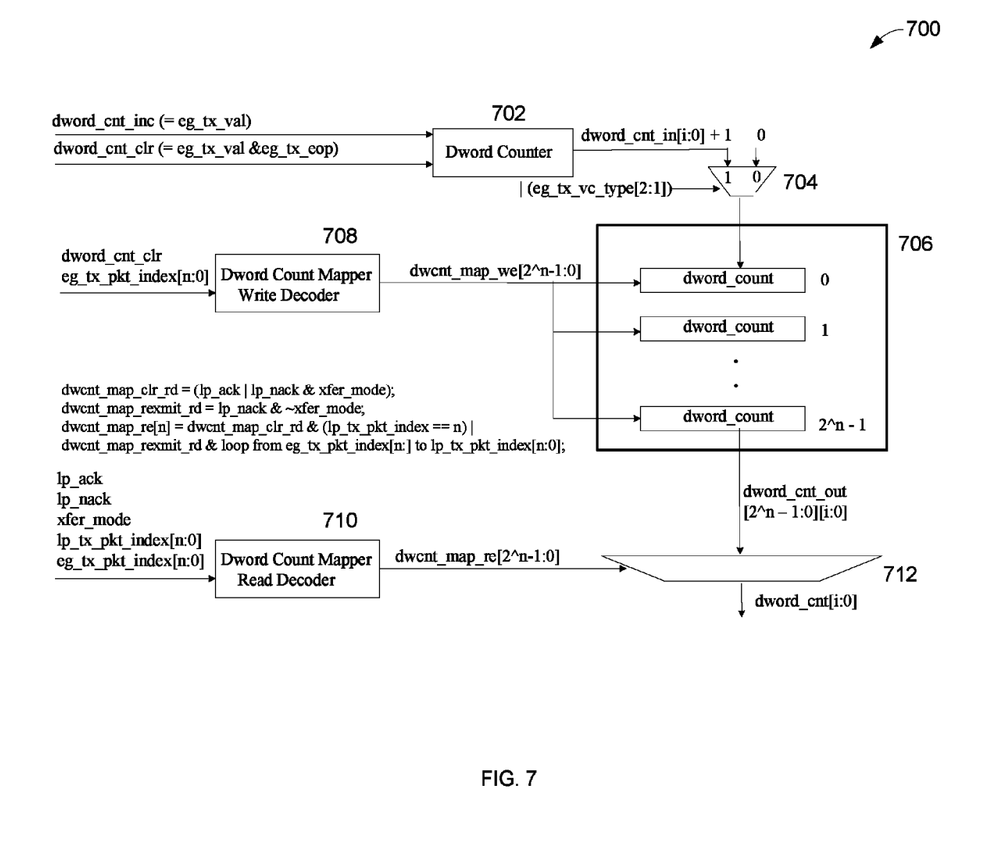
FIG. 7 illustrates one embodiment of the invention in block form.

FIG. 7 illustrates, generally at 700, one embodiment of the invention in block form.

In one embodiment of the invention, for example, as illustrated in FIG. 7, i=5 to support up to 35 dword maximum size packet.

In one embodiment of the invention, for example, as illustrated in FIG. 7, n=5 to support up to 64 entries of dword count mapper.

In one embodiment of the invention, for example, as illustrated in FIG. 7, each time a packet's dword is being sent out, dword_cnt_inc will be asserted through Egress Transmit Valid (eg_tx_val) signal to increment Dword Counter until dword_cnt_clr is asserted at the end of the packet through "Egress Transmit Valid signal and with Egress Transmit End of Packet signal (eg_tx_val & eg_tx_eop)" to clear dword counter.

In one embodiment of the invention, for example, as illustrated in FIG. 7, when dword_cnt_clr is asserted, the corresponding entry of Dword Count Mapper being indexed through transmitted packet index (eg_tx_pkt_index[n:0]) will be updated with the dword count of the VC1 packet (eg_tx_vc_type[1]=1) or the VC5 packet (eg_tx_vc_type[2]=1).

In one embodiment of the invention, for example, as illustrated in FIG. 7, the stored information being selected through the returned packet index (Ip_tx_pkt_index[n:0]) will be used to decrement VC1/VC5 dword counter (to free Buffer space) when ACK (Ip_ack) is returned for a RT/CT mode packet or NACK (Ip_nack) is returned for all the outstanding CT mode (xfer_mode=1) packets (between Ip_tx_pkt_index[n:0] and eg_tx_pkt_index[n:0]).

In FIG. 7 at 702, and 712 are selection logic. At 702 is Dword Counter. At 708 is Dword Count Mapper Write Decoder. At 710 is Dword Count Mapper Read Decoder. At 706 is storage for dword_count.

Packet Response Handler

In one embodiment of the invention there is a Packet Response Handler.

In one embodiment of the invention, Outbound Packet Response Handler will be used to handle packet retransmission with VOQ read pointer realignment and release memory page pointer (for VC0 packets) or dword count (for VC1/VC5 packets).

In one embodiment of the invention, upon receiving ACK (packet accepted control symbol) from Outbound Link Partner, Retransmit Mapper look up will be performed through the returned packet index. Each time a stored entry is being retrieved, voq_index[9:0] will be used to determine packet's VC type (voq_index[9] for VC5, voq_index[8] for VC1 & voq_index[7:0] for VC0 with 8 different priority); transfer mode will be used to determine packet's transfer mode (xfer_mode=0 for RT mode; xfer_mode=1 for CT mode). For VC0 packet, the retrieved memory page pointer will be released to Free Buffer List for future use. Otherwise, VC1/VC5 packet will further look up Dword Mapper to retrieve the stored dword count for this packet, which will then be released to Dword Counter for future use (N.B. releasing frees up buffer space).

In one embodiment of the invention, if NACK (packet not accepted control symbol) is received instead of ACK, Retransmit Mapper look up will be performed similarly. The retrieved voq_index[9:0] will be used to selected VC type and the retrieved xfer_mode will be used to select packet transfer mode. If the packet is a VC0 packet, as it can be only be in RT mode therefore the retrieved voq_rd_ptr will be realigned for packet retransmission needs. Otherwise, it is a VC1/VC5 packet. For RT mode, the retrieved voq_rd_ptr to be realigned the same way for packet retransmission needs and CT mode will cause Dword Mapper look up to retrieve the stored dword count and release to Dword Counter for future use as packet retransmission will not be necessary.

In one embodiment of the invention, for each ACK/NACK is being received, above sequence (ACK and NACK) will repeat to loop through all the non-acknowledged packets. For instance, if transmitted packet index is 9 and returned packet index is 4. Retransmit Mapper look up will be started from 4 through 9. Depending on the packet type (VC0/VC1/VC5) and transfer mode (RT/CT), the proper action will be taken to release memory page pointer (for VC0 packets) or dword count (for VC1/VC5 packets), or realign VOQ read pointer for packet retransmission (RT mode) or not realign VOQ read pointer if packet retransmission is not necessary (CT mode).

Figure 8:
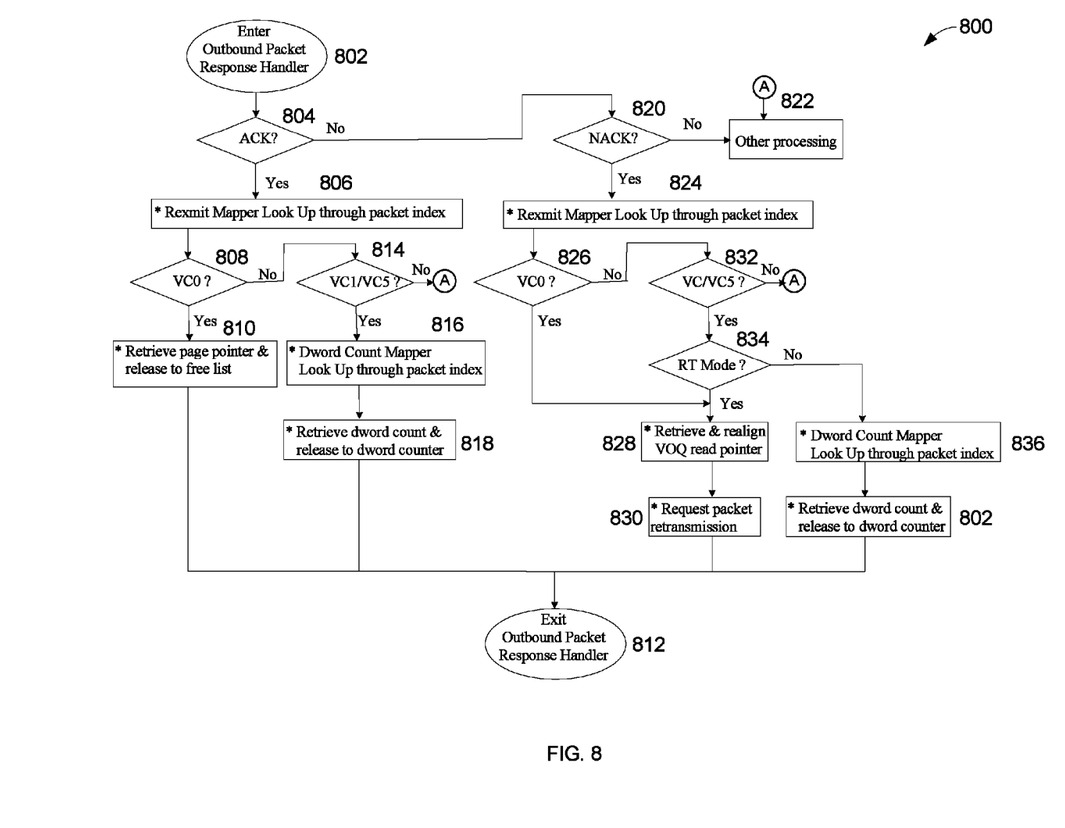
FIG. 8 illustrates, generally at 800, one embodiment of the invention in flow chart form.

FIG. 8 illustrates, generally at 800, one embodiment of the invention in flow chart form.

At 802 entry is made into the outbound packet response handler (Enter Outbound Packet Response Handler). At 804 a check is made to see if an ACK has been received (ACK?) and if so then at 806 a lookup through the packet index into the re-transmit mapper is made (* Rexmit Mapper Look Up through packet index). At 808 a check is made to see if the lookup is for VC0 (VC0 ?) and if so then at 810 a page pointer is retrieved and the released to a free list (* Retrieve page pointer & release to free list) and then at 812 the routine is exited (Exit Outbound Packet Response Handler). If at 808 it is not a VC0 then at 814 a check is made to see if the lookup is for VC1/VC5 (VC1/VC5 ?) and if not then other processing is done at 822 (denoted path circle A (Other processing)). If it is VC1/VC5 then at 816 there is a lookup through the packet index into the dword count mapper (* Dword Count Mapper Look Up through packet index) and at 818 the dword count is retrieved and released to the dword counter (* Retrieve dword count & release to dword counter) and then at 812 the routine is exited (Exit Outbound Packet Response Handler). If at 804 the check is not an ACK then at 820 a check is made to see if it's a NACK (NACK?) and if not then other processing is done at 822 (Other processing). If it is a NACK at 820 then at 824 then at 824 a lookup through the packet index into the retransmit mapper is made (* Rexmit Mapper Look Up through packet index). At 826 a check is made to see if the lookup is for VC0 (VC0?) and if so then at 828 the VOQ read pointer is retrieved and realigned (* Retrieve & realign VOQ read pointer) and at 830 packet retransmission is requested (* Request packet retransmission) and then at 812 the routine is exited (Exit Outbound Packet Response Handler). If at 826 it is not a VC0 then at 832 a check is made to see if the lookup is for VC1/VC5 (VC1/VC5?) and if not then other processing is done at 822 (denoted path circle A (Other processing)). If it is VC1/VC5 then at 834 there is a check to see if it's RT mode (RT Mode?) and if it is then at 828 the VOQ read pointer is retrieved and realigned (* Retrieve & realign VOQ read pointer) and at 830 packet retransmission is requested (* Request packet retransmission) and then at 812 the routine is exited (Exit Outbound Packet Response Handler). If at 834 it is not RT mode then at 836 there is a lookup through the packet index into the dword count mapper (* Dword Count Mapper Look Up through packet index) and at 802 the dword count is retrieved and released to the dword counter (* Retrieve dword count & release to dword counter) and then at 812 the routine is exited (Exit Outbound Packet Response Handler).

Thus a method and apparatus to optimize class of service under multiple VCs with mixed reliable transfer and continuous transfer modes have been described.

Figure 1:
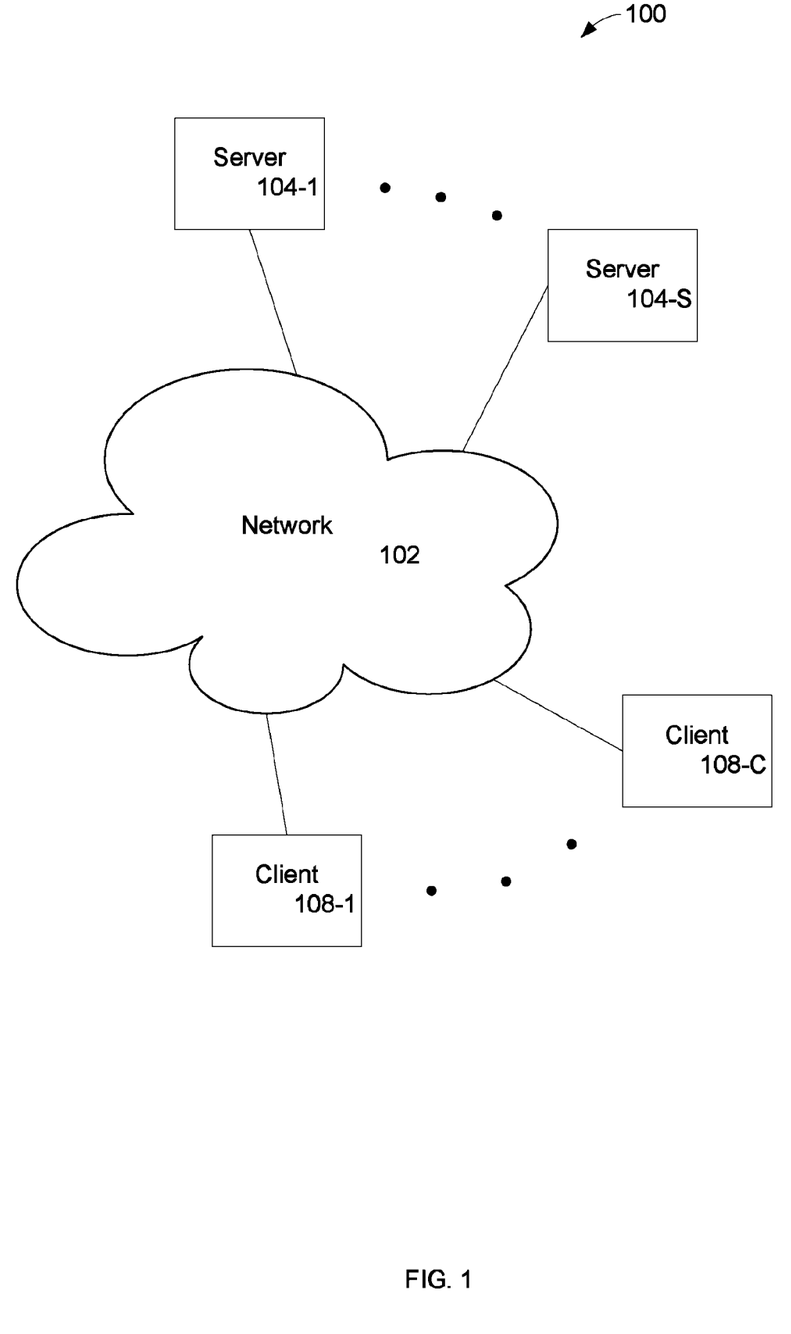
FIG. 1 illustrates a network environment in which the method and apparatus of the invention may be implemented.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
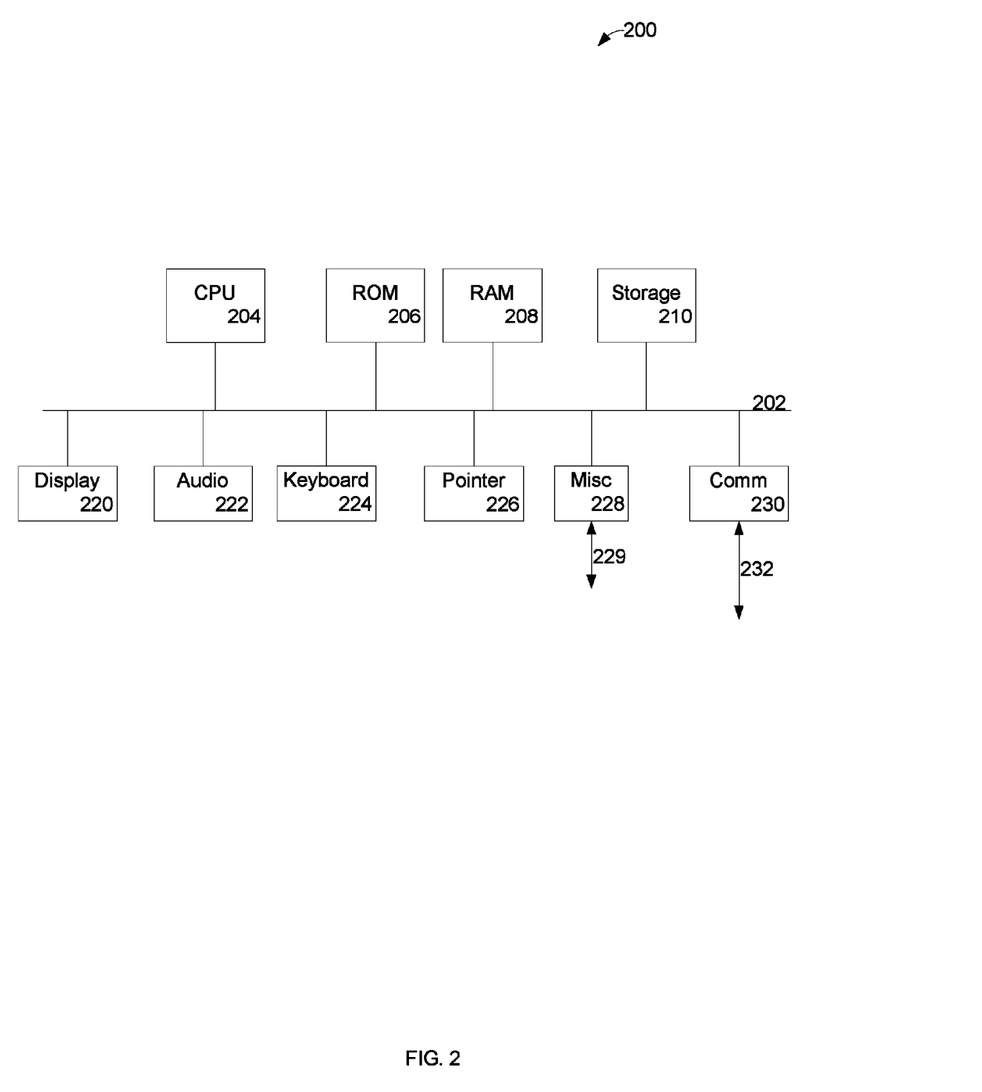
FIG. 2 is a block diagram of a computer system in which some embodiments of the invention may be used.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of visual communicating means or device whether local or remote, such as a LAN, a WAN, a system bus, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

Various spellings may be used for terms used in the description. These variations are to be understood to relate to the same term unless denoted otherwise. For example: failsafe is also spelled fail safe, and failsafe; start-up is also spelled startup, and start up; subthreshold is also spelled sub-threshold, and sub threshold; etc.

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals which upon reception causes movement in matter (e.g. electrons, atoms, etc.) (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

As used in this description, "acknowledgment" and "acknowledgement" are variant spellings of the same word and are to be considered the same even if both variants are used in a sentence, claim, etc.

It is to be understood that in any one or more embodiments of the invention where alternative approaches or techniques are discussed that any and all such combinations as my be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a method and apparatus to optimize class of service under multiple VCs with mixed reliable transfer and continuous transfer modes have been described.

What is claimed is:

1. A method comprising:
   (a) receiving a plurality of RapidIO packets, said plurality of packets requesting both Reliable Transfer (RT) and Continuous Transfer (CT) modes;
   (b) determining if one of said plurality of packets is requesting said RT mode and if so then:

(b1) determining if an input buffer is available to store said one of said plurality of packets and if so then:
(b1a) generating an acknowledgment (ACK); and
(b1b) writing said one of said plurality of packets into said input buffer;
(b2) else:
(b2a) generating a negative acknowledgment (NACK) to request an Inbound Link Partner retransmission of said one of said plurality of packets; and
(b2b) not writing said one of said plurality of packets into said input buffer.

2. The method of claim 1 further comprising:
(c) determining if one of said plurality of packets is requesting CT mode and if so then:
(c1) determining if an input buffer is available to store said one of said plurality of packets and if so then:
(c1a) generating an acknowledgment (ACK); and
(c1b) writing said one of said plurality of packets into said input buffer;
(c2) else:
(c2a) generating an acknowledgment (ACK); and
(c2b) not writing said one of said plurality of packets into said input buffer.

3. A method comprising:
(a) receiving a response from an Outbound Link Partner associated with a transmitted packet;
(b) determining if said response is an acknowledgement (ACK) and if so then:
(b1) performing a look up in a retransmit mapper by using an index associated with said transmitted packet to determine if said transmitted packet is from a Virtual Channel Zero (VC0) or a Virtual Channel One/Virtual Channel Five (VC1/VC5) and:
(b1a) if from said VC0 then:
(b1a1) retrieving a page pointer associated with said transmitted packet; and
(b1a2) releasing said page pointer to a free list;
(b1b) if from said VC1/VC5 then:
(b1b1) performing a look up in a dword count mapper by using said index associated with said transmitted packet; and
(b1b2) retrieving a dword count associated with said transmitted packet; and
(b1b3) releasing said dword count to a dword counter for freeing up buffer space.

4. The method of claim 3 further comprising:
(c) determining if said response is a negative acknowledgement (NACK) and if so then:
(c1) performing a look up in a retransmit mapper by using an index associated with said transmitted packet to determine if said transmitted packet is from said Virtual Channel Zero (VC0) or said Virtual Channel One/Virtual Channel Five (VC1/VC5), and Reliable Transfer (RT) or Continuous Transfer (CT) mode and:
(c1a) if from said VC0 then:
(c1a1) retrieving a Virtual Output Queue (VOQ) read pointer associated with all VC0 outstanding transmitted packets; and
(c1a2) realigning said VOQ read pointer; and
(c1a3) requesting packet retransmission;
(c1b) if from said VC1/VC5 then:
(c1b1) if RT mode then:
(c1b1a) retrieving a VOQ read pointer associated with all VC1/VC5 RT mode outstanding transmitted packets; and
(c1b1b) realigning said VOQ read pointer; and
(c1b1c) requesting packet retransmission;
(c1b2) if not RT mode then:
(c1b2a) performing a look up in a dword count mapper by using said index associated with all VC1/VC5 CT mode outstanding transmitted packets; and
(c1b2b) retrieving a dword count associated with said all VC1/VC5 CT mode outstanding transmitted packets; and
(c1b2c) releasing said dword count to a dword counter.

5. An apparatus comprising:
means for transmitting a RapidIO packet from an egress port's final buffer; and means for storing information about said packet's Virtual Channel (VC) type, transfer mode, memory page pointer and Virtual Output Queue (VOQ) read pointer into a Packet Retransmission Mapper, wherein said information is stored while said packet is being transmitted out of said egress port's final buffer.

6. The apparatus of claim 5 further comprising:
means for determining if said packet is a Virtual Channel One/Virtual Channel Five (VC1/VC5) packet and if so then storing said packet's dword count into a Dword Count Mapper.

7. The apparatus of claim 6 further comprising:
means for receiving an acknowledgement (ACK) or negative acknowledgement (NACK) returned from an Outbound Link Partner;
means for retrieving said stored information associated with said ACK or NACK from said Packet Retransmission Mapper or said Dword Count Mapper;
means for identifying all outstanding packets; and
means for retransmitting said outstanding packets or releasing said outstanding packets buffer.

* * * * *